Nov. 7, 1967

R. A. McKIRNAN 3,350,930

PRESSURE GAUGE

Filed Aug. 13, 1965

INVENTOR.
Robert A. McKirnan,
BY Parker & Carter
Attorneys.

Nov. 7, 1967 R. A. McKIRNAN 3,350,930

PRESSURE GAUGE

Filed Aug. 13, 1965 3 Sheets-Sheet 2

INVENTOR.
Robert A. McKirnan,
BY Parker & Carter
Attorneys.

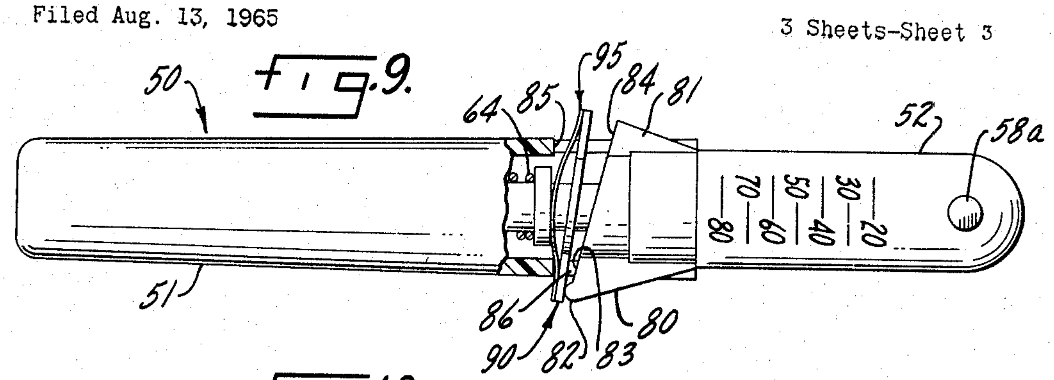
FIG. 9.
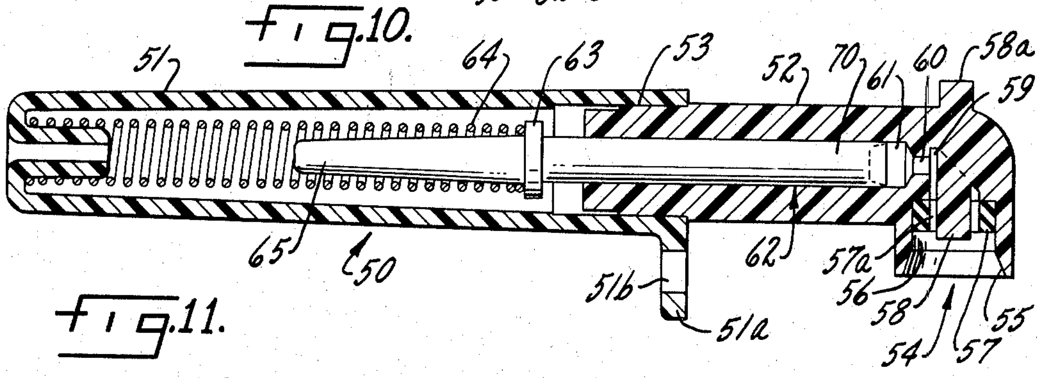
FIG. 10.
FIG. 11.
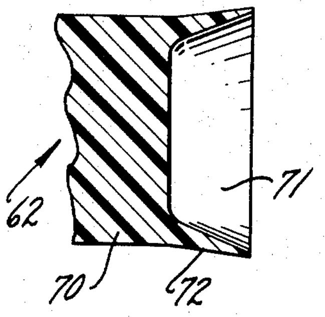
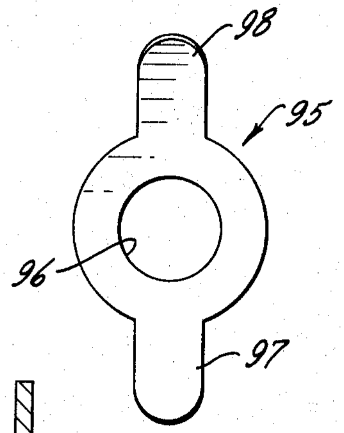
FIG. 12.
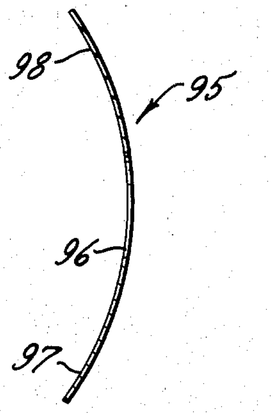
FIG. 13.
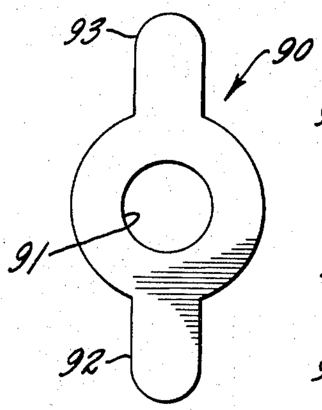
FIG. 14.
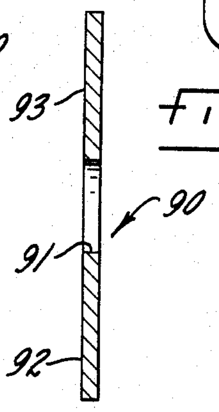
FIG. 15.
INVENTOR.
Robert A. McKirnan,
BY Parker & Carter
Attorneys.

United States Patent Office 3,350,930

Patented Nov. 7, 1967

3,350,930

PRESSURE GAUGE

Robert A. McKirnan, Winnetka, Ill., assignor to Rambar Corp., Chicago, Ill., a corporation of Illinois Filed Aug. 13, 1965, Ser. No. 479,483
5 Claims. (Cl. 73—146.3)

The present application is a continuation-in-part of copending application, Ser. No. 384,945, filed July 24, 1964, entitled, "Pressure Gauge," and now abandoned.

This invention relates to a pressure gauge and has particular relation to a pressure gauge for measuring the pressure in bicycle tires.

One purpose of this invention is to provide a pressure gauge which is inexpensive to manufacture, yet usable to properly measure the relatively high air pressure of bicycle tires.

Another purpose is to provide a gauge having a pressure indicator which will remain in the indicating position after the pressure is removed and until it is manually released.

Another purpose is to provide a pressure gauge in which the pressure indicating device will be automatically returned to its atmospheric pressure position after the indicator is manually released from the indicating position.

Other purposes will appear from time to time during the course of the specification and claims.

The invention is illustrated more or less diagrammatically in the accompanying drawings, wherein:

FIGURE 9 is a top plan view of another form of the invention;

FIGURE 10 is a cross-sectional view of the device of FIGURE 9;

FIGURE 11 is a detailed view of a portion of the gauge plunger;

FIGURE 12 is a plan view of a lock-insuring member of the invention;

FIGURE 13 is a cross-sectional view of the device of FIGURE 12;

FIGURE 14 is a detailed view of a lock member of the invention; and

FIGURE 15 is a cross-sectional view of the device of FIGURE 14.

Like parts are indicated by like numerals throughout the specification and drawings.

Figure 1:
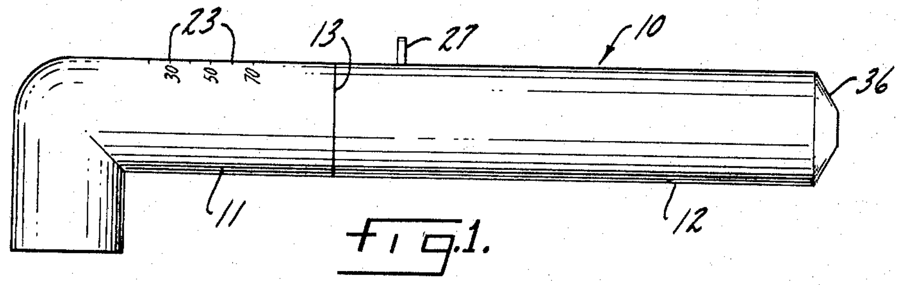
FIGURE 1 is a side elevational view.
Figure 2:
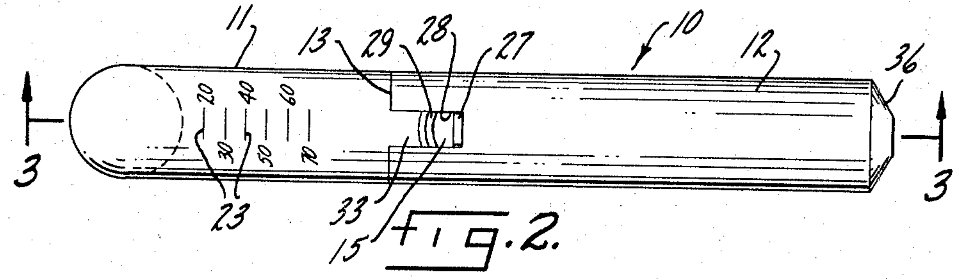
FIGURE 2 is a top view.
Figure 3:
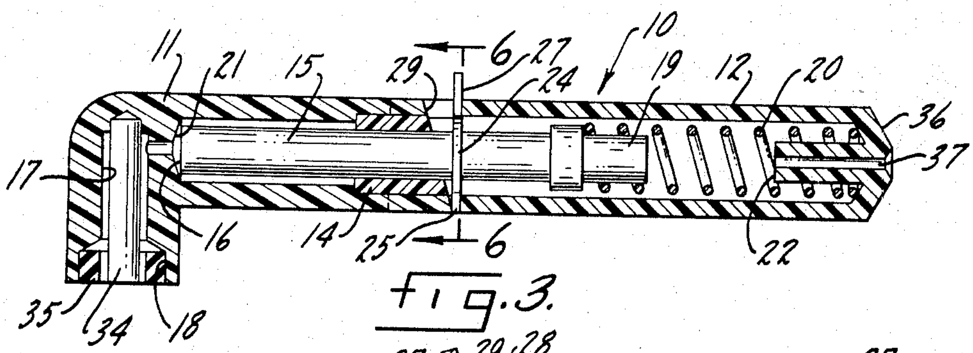
FIGURE 3 is a cross-sectional view taken along line 3—3 of FIGURE 2.
Figure 4:
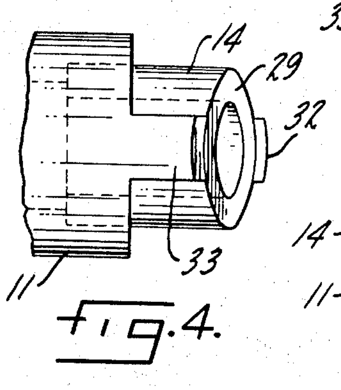
FIGURE 4 is an enlarged view showing the insert projecting from the first tube.

Referring now to the drawings, and particularly to FIGURE 3, the pressure gauge is generally illustrated at 10 and includes a first or front tube 11 and a second or rear tube 12 which abut at 13 and overlap a tubular insert 14 extending outwardly from the first tube. The tubes and insert are preferably molded of a plastic such as styrene. A plunger or cylinder 15 is mounted in the first tube for reciprocal movement relative thereto and extends through the insert into the rear tube 12. The plunger 15 fits snugly in the insert 14 so that air pressure exerted on the front end 16 of the plunger will not readily leak out and will force the plunger to move relative to the first tube and into the second tube. The plunger in this instance is made of polypropylene. In order to provide access for pressure to act against the front end of the cylinder, a passage 17 leading into the interior of the tube 11 is provided. This passage 17 connects to an opening 18 which is formed and adapted to receive a stem of a tire.

The opposite or rear end 19 of the plunger 15 extends into the second or rear tube 12 and engages a compressible coil spring 20 which fits inside the second tube and bears against a partially closed end 36 thereof. This spring functions to bias the plunger toward the front end of the first tube and to provide a calibrated resistance against movement of the plunger out of the first tube under air pressure. A stop 21 is provided at the front end of the first tube adjacent the passage 17 to engage the plunger and hold it in its at-rest or atmospheric pressure position against the force of the spring. In this instance, the stop is formed by reducing the inner diameter of the tube. With this arrangement, the plunger is held in its atmospheric pressure position until a build-up of pressure in the passage forces the plunger 15 to move in the first tube and into the second tube. The amount of pressure acting on the plunger will determine the distance the plunger moves in the tubes. Movement of the plunger entirely out of the first tube is prevented by a cylindrical stop 22 extending axially inwardly from the partially closed end of the second tube which engages the rear end 19 of the plunger. A vent 37 is provided in the second tube to prevent the build-up of pressure as the plunger moves in.

The amount of pressure acting on the front end 16 of of the plunger 15 is determined by measuring the movement of this end of the plunger relative to the first tube 11 from its at-rest or atmospheric position adjacent the stop 21. In order to provide for visual determination of the amount of plunger travel, the first tube is made of a transparent material, in this case styrene, the plunger is made of a contrasting opaque material, in this case polypropylene, and spaced numbered marks 23 corresponding to the various pressures are provided along the length and on the exterior of the first tube.

Figure 5:
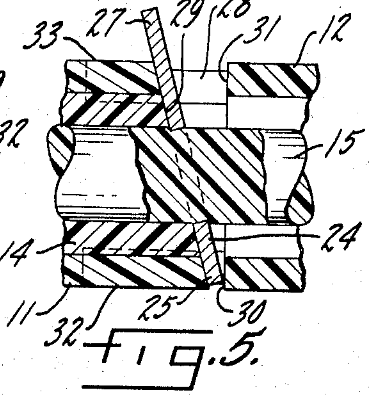
FIGURE 5 is a cross-sectional view showing the plunger locked in a pressure-indicating position.
Figure 6:
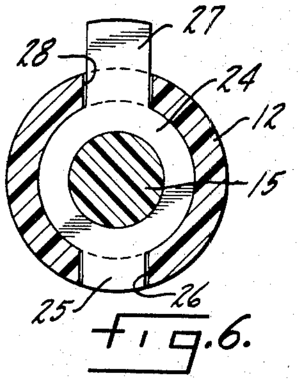
FIGURE 6 is an enlarged cross-sectional view taken through the gauge and showing the pressure-indicating or retaining mechanism.

In order to accurately measure the amount of travel of the plunger 15 relative tothe first tube 11, it is necessary to retain the plunger in tis position of maximum travel. Therefore, releasable locking means are provided to prevent the plunger from returning to its at-rest or atmospheric pressure position under the influence of the spring 20 when the pressure is relieved on the front end 16 of the plunger. The plunger is shown held in a pressure-indicating position in FIGURE 5. It is also necessary that these means not interfere with the free movement of the plunger under pressure. These purposes are accomplished, in this instance, by the provision of a flat annular locking member 24 which fits between the tubes and around the plunger to engage the plunger and the first tube to stop movement of the plunger when the plunger starts to move back into the first tube under the influence of the spring 22. The member in this instance is made of metal. The outer diameter of the annular locking member is sized to fit inside the second tube 12 and the inner diameter to fit snugly around the plunger.

The locking member 24 is assembled in the gauge by placing it on the plunger 15 before the plunger is inserted in the first tube 11. When the plunger is inserted in the first tube, the annular member can be slid along the plunger until it contacts the insert 14. When the annular member is in this position, the second tube 12 will fit over it when it is telescoped over the insert. In order to retain the annular member in position against the insert, an outwardly projecting ear 25 is provided on one side thereof. This ear fits into a notch 26 formed in the second tube, and is held in position by contact with a rib 32 extending along the first tube and a portion of the second tube forming an end 30 of the notch 26. So that the second tube can be slid over the ear when it is connected to the first tube, the notch extends from the abutting end of the tube. Another rib 33 is provided on the opposite side of the tube in alignment with the notch 28.

With one side of the annular member 24 held in this manner, its opposite side is free to be moved longitudinally of the tubes to tilt the member. Due to the snug fit between the plunger 15 and the annular member, the annular member will tend to move as the plunger moves. To limit this movement, a second ear 27 extending diametrically to the first ear is provided on the annular member. This second ear extends outwardly of the tubes through a slot 28 in the second tube 12 and is engageable with the tubes.

When the annular member 24 is maintained in a plane normal to the axis of the plunger 15, the plunger is free to move back and forth through the opening therein, but when the annular member is tilted relative to the plunger, it engages the plunger. This action of the annular member is utilized to prevent return of the plunger to the first tube 11 after pressure on the plunger is relieved without restricting movement of the plunger out of the first tube. This is done by forming the tubes 11 and 12 and insert 14 so that the annular member can be tilted only toward the first tube. This is accomplished by forming the insert with an inclined end surface 29 adjacent the annular member arranged so that the portion of the surface adjacent the ear 27 is closer to the first tube than the portion adjacent the ear 25 and providing stop surfaces on the second tube which lie in a plane normal to the axis of the plunger. In this instance, the stop surfaces 30 and 31 are formed as the ends of the notches 26 and 28, respectively.

As the plunger 15 moves out of the first tube 11 and through the annular member 24 under the influence of pressure in the passage 17, the ears 25 and 27 will be forced against the stops 30 and 31 and the annular member will be held in a plane normal to the axis of the plunger, thus permitting free movement of the plunger therethrough. When the pressure is released from the passage 17, the spring 20 will urge the plunger back into the first tube and through the annular member and the annular member will tend to move with the plunger. The ear 25 of the annular member will be held by engagement with the rib 32, but the ear 27 will be free to move toward the first tube. Thus, the member will tilt and engage the plunger. The member and the plunger will move toward the first tube until the member contacts the surface 29 of the insert 14 at which point the movement of the plunger is stopped. After the pressure reading is made, the plunger can be released to return to its at-rest position under the influence of the spring 20 by engaging the ear 27 and moving it into contact with the stop 31. This moves the annular member to a position normal to the plunger and permits unimpeded movement of the plunger through the member.

To facilitate use of the gauge, the end of the tube 11 containing the opening 18 is bent 90 degrees relative to the tube to position the opening 18 at right angles to the axis of the tube. This enables the gauge to be used in more cramped positions.

The opening 18 has a concentrically positioned member 34 which engages and depresses the center rod of the valve stem to open the valve and allow pressure to escape from the tire and enter the passage 17 of the first tube of the gauge. Sealing means in the form of an annular ring 35 is provided inside of the opening 18, and this ring engages the sides of the stem to prevent leakage of air when the gauge is connected to the valve stem.

Figure 7:
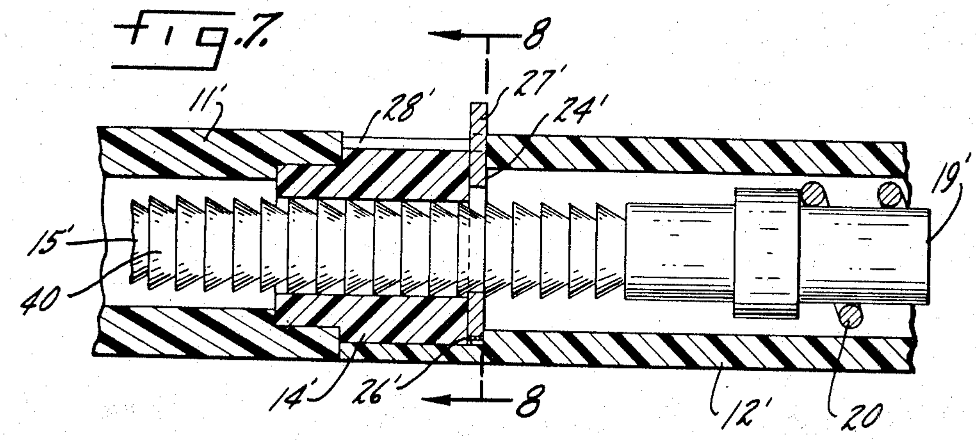
FIGURE 7 is a partial cross-sectional view showing a modified form of the invention.
Figure 8:
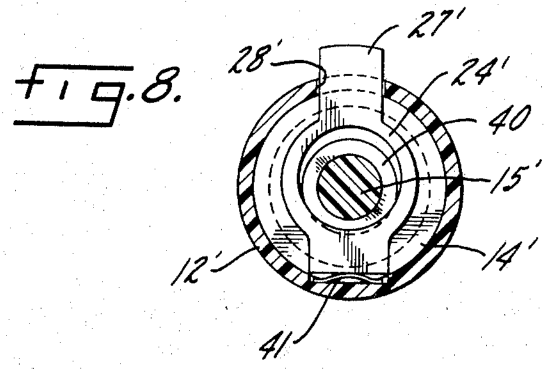
FIGURE 8 is an enlarged cross-sectional view taken through the gauge and showing the modified pressure indicator retaining mechanism.

A modified form of the invention is shown in FIGURES 7 and 8 in which a plunger 15′ having serrations 40 forming a ratchet surface and a releasable locking member 24′ in the form of an annular ring are provided.

The locking member is held against the plunger by a leaf spring 41 positioned in a notched recess 26′ in the rear tube 12′ and is prevented from axial movement by engagement with the tubes. The serrations are formed, as shown in FIGURE 7, so as to permit the plunger to move past the locking member in the direction of the coil spring 20, but to engage the locking member and prevent the plunger from returning to its at-rest position when the pressure on the plunger is released.

To release the plunger 15′ and permit its return to the at-rest position, the locking member 24′ is mounted in the rear tube 12′ for sliding movement out of engagement with the serrations 40 of the plunger. In this instance, the locking member has an opening complementary in shape to the plunger and slightly larger so that when the locking member is depressed until the opening and the plunger are aligned, the plunger is free to move through the opening and return to its at-rest position. The locking member has an ear 27′ extending outwardly of the tubes through a notch 28′ to provide a means for depressing the locking member.

Referring now to FIGURES 9–15, a variant form of the invention is illustrated. The gauge housing 50 is conveniently formed of two parts 51, 52 which, upon assembly, are secured at their interpenetrating portions, indicated at 53, preferably by cementing or gluing the same together. Housing portion 51 has an integrally formed ear 51*a* apertured as at 51*b* to provide for securing the device of the invention against loss, the ear 51*a* being attachable to a key chain, for example. Housing portion 52 has a tire valve-receiving socket or bore 54 directed at right angles to the axis of housing 50. The bore 54 has an inwardly tapering bowl section 55 joining a cylindrical wall section 56. Seated within the wall section 56 is a seal or gasket member 57. A tire valve actuating finger 58 extends axially of bore 54 through the central opening 57*a* in seal 57. An abutment 58*a* rises upwardly from housing 52 in axial alignment with finger 58 for ready engagement by the thumb of the user, for example, and for ready alignment of the bore 54 with the valve stem of the tire to be measured. Finger 58 extends slightly beyond gasket 57 and has an outer diameter less than the diameter of opening 57*a*. An air passage 59 is formed in housing portion 52 and communicates the opening 57*a* and thus bore 54 with a perpendicularly disposed passage portion 60. Passage 60 in turn communicates with elongated gauge chamber 61 in housing portion 52. Slidable in housing portion 52 is a gauge plunger 62. Plunger 62 extends outwardly of housing portion 51. A flange 63 is carried by plunger 62 within housing portion 51 and spring 64 engages flange 63 and a rear wall of housing portion 51 to urge plunger 62 toward passage 60. Beyond the flange 63 plunger 62 has an inwardly tapering or frusto-conical end portion 65 extending axially into spring 64.

The end portion 70 of plunger 62 opposing air pressure inlet passage 60 is counterbored as indicated at 71 and as may be best seen, for example, in FIGURE 11. The counterbore 71 is surrounded by an outwardly flared and tapered skirt 72.

Housing portion 52 carries a fulcrum extension 80 which may be conveniently formed integrally with housing portion 52. Diametrically opposed from extension 80, and extending in the opposite direction therefrom on housing portion 52, is a cord extension 81. Extension 80 has a fulcrum knob 82 and a rearwardly inclined wall portion 83 extending from knob 82 toward housing 52. Similarly, cord extension 81 has an inclined wall portion 84 lying in the continuing plane of wall 83. Housing portion 51 has longitudinal slots 85, 86 in diametrically aligned positions in its wall. Slot 85 receives cord extension 84. Slot 86 receives fulcrum extension 80. As may be best seen, for example, in FIGURE 9, cord extension 80 and fulcrum knob 82 approach much closer to the base of slot 86 than does extension 81 toward the base of slot 85.

A lock member 90, shown in detail in FIGURES 14 and 15, has a central aperture 91 only slightly greater in diameter than the diameter of plunger 62 and plunger 62 extends through aperture 91. The lock member 90 has, extending in opposite directions, extensions 92, 93. Extension 92 is received in slot 86 and engages fulcrum knob 82. Extension 93 is received and is movable within slot 85 between its base and wall 84 of extension 81. A lock-insuring member 95, shown in detail in FIGURES 12 and 13, has a central aperture 96 somewhat larger than the aperture 91 in member 90. Member 95 has oppositely extending portions 97, 98 corresponding substantially to extensions 92, 93 of member 90. As may be best seen in FIGURE 13, member 95 is concave-convex in cross-sectional configuration and is of substantially thinner cross section than the rectilinear cross section of member 90 shown best, for example, in FIGURE 15. Plunger 62 extends through aperture 96 in member 95 beyond member 90. Extension 97 of member 95 extends through slot 86 and engages extension 92 of member 90 and the base of slot 86. Extension 98 of member 95 engages extension 93 of member 90 when the parts are in the position shown in FIGURE 9. Upon movement of member 90 into perpendicular relationship with plunger 62 and housing 50, it will be seen that extension 98 of member 95 engages the base of slot 85.

In operation, the device of FIGURES 9–15 is productive of particular advantages. The flared wall 55 of bore 54 insures ready engagement and centering of the tire valve stem housing. Finger 58 engages and depresses the valve stem, permitting air pressure from the tire of the bicycle or automotive vehicle or the like to pass through passages 59 and 60 and into chamber 61. It will be realized that the wall of chamber 61 may be tapered and have minor imperfections in manufacture. The outwardly flared skirt 72 surrounding counterbore 71 of plunger end 70 provides a feather edge which insures engagement of the wall of chamber 61 as the plunger is moved in response to delivery of air pressure into chamber 61 and thus insures against the escape of said air pressure. Plunger 62 is moved against the action of spring 64 by the air pressure entering chamber 61. As may be best seen in FIGURE 9, appropriate indicia is formed on or affixed to a surface of housing portion 52, which may be transparent and may be suitably formed of an appropriate plastic. Similarly, plunger 62 may be colored a readily recognizable color and the feather edge 72 will be moved along the indicia to indicate (the parts having been previously carefully calibrated) the actual air pressure in the vehicle tire.

As plunger 62 moved rearwardly it carried the lock member 90 from the position illustrated in FIGURE 9 to a position perpendicular to the axis of plunger 62 and housing 50, for example, to the position shown in FIGURE 3 with respect to member 24, the member 90 rocking on fulcrum abutment 82. In so doing, a compression of lock-actuating spring member 95 was created against the base of slot 85 and the normal small amount of compression illustrated in FIGURE 9 created between member 90 and the base of slot 86 upon extension 97 of member 95 was increased. When the plunger 62 has been moved to the appropriate point along the indicia formed on housing portion 52 corresponding to the pressure within the vehicle tire, the device of the invention is removed from the tire valve stem. Upon such removal there is, of course, immediate diminution of pressure within chamber 61 and spring 64 would normally be effective to return plunger 62 to the position illustrated, for example, in FIGURES 9 and 10. Since the user desires to lift the gauge of the invention from the tire for reading, it is desired to lock the plunger 62 in the precise position along said indicia to which it had been moved to the pressure in the tire. Movement of the plunger 62 under the influence of spring 64 would carry member 90 into an inclined locking position, such as that shown in FIGURE 9, or to an even more inclined position against the wall 84 of extension 81. Such movement of plunger 62 could, however, tend to create a false indication of the actual pressure within the vehicle tire measured. This is important in a gauge of reduced size and cost wherein relatively minute movements of plunger 62 may indicate substantial differences in pressures measured. The member 95, however, is effective, immediately upon release of air pressure in chamber 61, to snap member 90 back into locking position before plunger 62 has had a chance to move under the influence of spring 64 back toward its normal position, such as that shown in FIGURES 9 and 10. Hence the plunger 62 will be caught in the position to which it had been moved to the pressure within the tire and an accurate reading of said pressure is obtained. Once said reading has been determined, the user moves the extension 93 of member 90, and with it the extension 98 of member 95, away from cord extension 81 and toward the base of slot 85, thus moving lock member 90 into nonlocking, perpendicular position and permitting spring 64 to return the plunger 62 to its normal position, as indicated in FIGURES 9 and 10. The user may move extension 93 conveniently by thumb pressure along cord 81 and into engagement with extension 93. When the plunger 62 has returned to its normal position, the user releases member 90 which then seeks a normal position, such as that illustrated, for example, in FIGURE 9.

I claim:

1. A pressure gauge including first and second elongated tubes joined end to end, an opening leading into said first tube at the free end thereof, said opening formed and adapted to receive a valve stem, means mounted in said opening to engage and depress a valve stem rod when said valve stem is received in the opening, pressure sealing means in said opening and adapted to engage the valve stem in sealing relation, a plunger mounted in said first tube and movable axially of said tubes away from said opening upon the increase of pressure in said first tube, spring means mounted in said second tube and engaging said plunger to bias said plunger toward said opening, releasable locking means engageable with said plunger and said tubes to prevent movement of the plunger toward the opening, and means to visually indicate the amount of movement of the plunger relative to the tubes, said releasable locking means comprising a flat member straddling said plunger and movable therewith upon movement of the plunger, said member having an opening to receive the plunger with the member formed and adapted to permit the plunger to freely move through said opening and relative to said member only when the member is held in a plane normal to the axis of the plunger and to engage said plunger to prevent relative movement of the plunger when the member is tilted out of a plane normal to the axis of the plunger, said tubes formed and adapted to provide first and second stop means on opposite sides of said member, said first stop means being located on the side of the member away from said opening and engageable with said member to hold the member in a plane normal to the plunger as the plunger moves toward said first stop means and second stop means on the side of the member facing said opening and engageable with said member to tilt and hold the member in a plane which is inclined to the axis of the plunger as the plunger moves toward said second stop means.

2. A pressure gauge including first and second elongated tubes joined end to end, an opening leading into said first tube at the free end thereof, said opening formed and adapted to receive a valve stem, means mounted in said opening to engage and depress a valve stem rod when said valve stem is received in the opening, pressure sealing means in said opening and adapted to engage the valve stem in sealing relation, a plunger mounted in said first tube and movable axially of said tubes away from said opening upon the increase of pressure in said first tube, spring means mounted in said second tube and engaging said plunger to bias said plunger toward said opening, releasable locking means engageable with said plunger and said tubes to prevent movement of the plunger toward the opening, and means to visually indicate the amount of movement of the plunger relative to the tubes, said releasable locking means comprising a flat annular member having an opening to receive the plunger with the member formed and adapted to permit the plunger to freely move through said opening and relative to said member only when the member is held in a plane normal to the axis of the plunger and to engage said plunger to prevent relative movement of the plunger when the member is tilted out of a plane normal to the axis of the plunger, a pair of diametrically opposed and radially extended ears projecting outwardly from said member, a pair of diametrically spaced notches formed in at least one of said tubes, said annular member being positioned interiorly of said tubes with said ears fitting in said notches and at least one of the ears extending outwardly of the tubes, said tubes formed and adapted to engage the ears to hold one ear in a substantially fixed position and to permit limited movement of the other ear in its respective notch and toward said opening so that movement of the plunger toward said opening will cause tilting of the member and locking engagement of the member, plunger and tubes while movement of the plunger away from said opening will move the member to a plane normal to the axis of the plunger to permit free movement of the plunger through said opening.

3. In a gauge a housing formed of first and second housing parts, diametrically opposed slots in one of said parts, said slots being substantially equal in length and penetrating one edge of said last-named part, diametrically opposed abutments on the other of said parts, said abutments extending in opposite directions and dimensioned to be received in said slots, one of said abutments being rearwardly disposed with relation to the other of said abutments, a locking means having oppositely directed extensions thereon, a compression member having oppositely directed extensions thereon, said locking means and compression member each having one of their extensions clamped between one of said abutments and the base of its associated slot and the other of their extensions movable between the other of said abutments and the base of its associated slot when said housing parts are joined and a plunger slidable in said housing for engagement with said locking means when said locking means is in locking position.

4. A pressure gauge including a housing, a plunger slidable in said housing in one direction in response to fluid pressure entering said housing, a first yielding means urging said plunger in the opposite direction, and locking means for said plunger, said locking means including a relatively flat locking member, said locking member having an aperture, said plunger extending through said aperture, a pair of radially directed, oppositely extending ears on said locking member, one of said ears being secured in fixed relation with said housing, a slot in said housing, the other of said ears being movable in said slot, a second yielding means engaging said locking member, said second yielding means having an aperture, said plunger extending through said aperture in said second yielding means, said second yielding means having a pair of radially directed, oppositely extending ears, said second yielding means being of a bowed configuration between the outer edges of said ears, the ears of said yielding means engaging the ears of said locking member, one ear of said second yielding means being clamped between said housing and the one of said ears of said locking member, the other of said ears of said second yielding means engaging said housing when said locking member is in its nonlocking posiiton.

5 The structure of claim 4 characterized by and including a flange carried by said plunger, said first yielding means engaging said flange, said flange being positioned for engagement with said second yielding means when fluid pressure is not present in said housing.

References Cited

UNITED STATES PATENTS

| | | | |
|---|---|---|---|
| 1,251,745 | 1/1918 | Bowers | 73—419 X |
| 1,451,038 | 4/1923 | Faries | 73—419 X |
| 1,584,865 | 5/1926 | Kahle | 73—419 |
| 1,642,563 | 9/1927 | Shebol et al. | 73—396 |
| 1,683,471 | 9/1928 | Kraft | 73—419 X |
| 1,836,601 | 12/1931 | Key | 73—419 X |
| 1,923,776 | 8/1933 | Crowley | 73—419 X |
| 2,417,449 | 3/1947 | Rubin | 73—146.8 |
| 2,579,120 | 12/1951 | Mercer | 116—34 |
| 2,903,888 | 9/1959 | Gfoll | 73—146.8 |
| 3,036,681 | 5/1962 | Darde | 73—141 X |

FOREIGN PATENTS

| | | |
|---|---|---|
| 84,978 | 2/1958 | Denmark. |

LOUIS R. PRINCE, *Primary Examiner.*

D. O. WOODIEL, *Assistant Examiner.*